Patented Sept. 26, 1950

2,523,686

UNITED STATES PATENT OFFICE 2,523,686

CATALYTIC HYDRATION OF OLEFINS TO PRODUCE KETONES

Willem Frederik Engel, Amsterdam, Netherlands, assignor to Shell Development Company, San Francisco, Calif., a corporation of Delaware No Drawing. Application May 31, 1947, Serial No. 751,632. In the Netherlands March 31, 1944

Section 1, Public Law 690, August 8, 1946
Patent expires March 31, 1964

7 Claims. (Cl. 260—597)

1

The invention relates to a process of producing saturated open-chain ketones from olefins containing at least three carbon atoms per molecule. More specifically, the invention pertains to a novel process for the manufacture, in a single reaction step, of saturated aliphatic ketones from aliphatic monoolefins having the same number of carbon atoms per molecule. In one of the most specific embodiments, the invention is directed to a process for the economical conversion of propylene to acetone.

It is well known that acetone and the homologues of acetone are excellent solvents for many purposes, particularly in the cellulose acetate industry. The economical production of aliphatic ketones has been the subject of much investigation. While many conversion reactions have been investigated and many processes developed for the production of these valuable solvents, the use of particularly the higher aliphatic ketones has been limited by the expense of their production. Processes for the catalytic conversion of olefins to secondary alcohols and the subsequent conversion of the secondary alcohols to ketones are known, as are processes for the production of ketones from acetylenes, and the ester and aldehyde derivatives of alcohols containing at least two carbon atoms. Each of these processes, particularly when adapted to the production of ketones higher than acetone, requires expensive starting materials, or requires several processing steps which result in a relatively expensive product.

It has now been discovered that acetone and the higher aliphatic ketones may be obtained directly in a single step process employing the low-cost olefinic hydrocarbon by-products from the petroleum industry. It has also been discovered that composite catalysts containing certain metal oxides intimately mixed with certain metals, as such or as partially reduced metal oxides, have the unobvious properties of causing hydration and dehydrogenation or oxidation to take place in a single reaction chamber, or by some other reaction mechanism, causing the direct transformation of an olefin into a ketone in a single reaction step. It has been further discovered that ketones may be obtained in good yields by a single pass of the olefin and steam through the reactor, and that the yields may be increased by recycling the gaseous reaction product as a whole, or even further increased by separating and recycling the unreacted olefin.

The invention may therefore be generally stated to comprise the catalytic conversion of open-chain olefinic compounds containing at least three carbon atoms per molecule to open-chain ketonic compounds containing the same number of carbon atoms per molecule by passing the olefinic compounds, in the vapor phase and in the presence of steam at temperatures substantially above the boiling point of water and below that at which substantial decomposition or destruction of the nuclear carbon structure occurs, under elevated pressures which are substantially above atmospheric but below those pressures which cause the co-existence of a liquid phase in excess of the vapor phase at the temperatures employed, in the presence of a catalyst containing (1) an oxide of a metal of group II, III, IV or VI of the periodic table and (2) a metal or partially reduced oxide of a metal of group I, right hand column, group VII or group VIII of the periodic table.

The process of the invention is applicable to the treatment of the whole class of the open-chain olefinic hydrocarbons. However, ketones are more readily obtained when the process is applied to the catalytic treatment or conversion of olefinic compounds containing at least three carbon atoms and a single unsaturated linkage of the ethylenic type, and having no more than about eight carbon atoms in a straight chain. The process is also applicable to the catalytic conversion of the open-chain olefinic compounds which contain unreactive hydrocarbon radical substituents of the aromatic, cyclic or branched chain aliphatic types to mixtures containing substantial amounts of carbonyl compounds. This is particularly true when the compounds have relatively low boiling points and contain an ethylenic linkage between two aliphatic carbon atoms, each of which is attached to at least one atom of hydrogen. The following are illustrative examples of some of the open-chain olefinic compounds which may be catalytically converted in accordance with the process of the invention to produce ketones containing the same number of carbon atoms: propylene, butene-1, butene-2, pentene-1, pentene-2, 2-methyl-butene-1, 2-methyl-butene-2, hexene-1, hexene-2, hexene-3, 4-methyl-pentene-1, 3-methyl-pentene-1, 2- methyl-pentene-1, 2-methyl-pentene-2, 3-methyl-pentene-2, 4-methyl-pentene-2, 2,3-dimethyl-butene-1, 2,2-dimethyl-butene-1, 3,3-dimethyl-butene-1, 2,3-dimethyl-butene-2, heptylene-1, 5-methyl-hexene-1, heptylene-2, allylbenzene, propenylbenzene, etc. Examples of the preferred subgroup, which is alkenes in which at least one atom of hydrogen is attached to each carbon atom linked by the ethylenic double bonds, are: propene, the butenes, the mono-alkylated butenes, 3,3-dialkyl-butene-1, the pentenes, the mono-alkylated pentenes, the 3,3- and 4,4-dialkylated pentenes, etc.

The particularly suitable alkenes which when treated by the process of the invention produce ketones in good yields with even a single pass over the catalyst are those containing a terminal ethylene group, for example: propylene, butene-1, pentene-1, 3-methyl-pentene-1, hexene-1, 4-methyl-pentene-1, heptene-1, 3-methyl-hexene-1, 4-methyl-hexene-1, 5-methyl-hexene-1, octene-1, 3,3-dimethyl-butene-1, 3,3-dimethyl-pentene-1, 4,4-dimethyl-pentene-1, 3-ethyl-pentene-1, 4-methyl-pentene-1, 3,3-diethyl-hexene-1, 4,4-dimethyl-hexene-1, 5,5-dimethyl-hexene-1, 3-ethyl-4-methyl-pentene-1, 4-ethyl-3-methyl-pentene-1, 4-methyl-3-propyl-pentene-1, 4-ethyl-3-propyl-pentene-1, etc.

The above-mentioned olefinic compounds may be treated individually or as mixtures of olefins, or mixtures of olefins and saturated organic compounds. When treated as a mixture, as, for example, a mixture of an olefin and a paraffin, the olefin is converted to a ketone and the paraffin remains substantially, if not wholly, unchanged by the process. It is therefore possible to convert to ketones the olefinic by-products of the petroleum industry without first separating the individual hydrocarbons. The process of the invention may also be adapted for the isolation or separation of certain saturated hydrocarbons, ethers, nitro compounds, sulfides and the like which are substantially unaffected by steam at the temperatures and pressures employed, from their mixtures with unsaturated compounds of similar boiling points by converting the unsaturates to carbonyl compounds for a subsequent separation by virtue of their greatly changed boiling points, or by the well known methods of isolating carbonyl compounds. In the production of the higher ketones it will often be found highly advantageous to treat a mixture of olefins and separate the individual ketones formed rather than isolating the olefins and/or paraffins which have much more closely related physical properties than do the corresponding ketones.

Examples of olefin to ketone conversions which may be readily attained by the process of the invention are: propylene to acetone, butene-1 and butene-2 to methyl ethyl ketone, pentene-1 to methyl propyl ketone, pentene-2 to methyl propyl ketone and diethyl ketone, etc. Straight chain olefins of three or more carbon atoms containing a terminal ethylenic group when treated according to the process of the invention produce only the methyl ketones. However, when the unsaturated linkage is located beta,gamma or further from the terminal carbon atom, isomeric ketones may be produced, for example, pentene-2 produces substantial amounts of methyl propyl ketone as well as diethyl ketone.

The catalyst employed in the process of the inventon is a composite composed of (1) one or a plurality of oxides of metals selected from group II, III, IV or VI of the periodic table and (2) one or a plurality of metals or partially reduced metal oxides of metals selected from the right hand column of group I, group VII or group VIII of the periodic table. The metal oxide portion (1) may be composed of a single metal oxide of the indicated metals, or a mixture of metal oxides. The metal or partially reduced metal oxide portion of the catalyst (2) may be composed of a single metal or partially reduced metal oxide or a mixture of several metals and/or partially reduced metal oxides of metal selected from the above-indicated groups. The atomic ratios in which the metals that (as the free metal, the metal oxides or the partially reduced metal oxides) comprise the two combined portions of the catalyst may vary over wide proportional limits. Excellent catalysts are those in which the atomic ratios of the metals comprising portion (1) are to the atomic ratios of the metals comprising portion (2) from as low as 0.5 to as high as 15 or even higher to 1. Catalysts which are of particular value for the conversion of the lower olefins to ketones are those in which portion (1) is composed of oxides of metals from the upper half of group III or IV in a major portion and from groups II, VI and the lower portion of group IV, in a minor portion, and wherein the metals of portion (1) are to the metals of portion (2) in an atomic ratio of from about 1 to about 10 to 1. Optimum conversions of propylene to acetone have been obtained with a copper-alumina catalyst containing small amounts of thorium and chromium oxides. Illustrative examples of the metals which as the oxides are suitable components of catalyst portion (1) are: the metals of group II as beryllium, strontium, barium, mercury and radium, of which the following oxides are of particular value—magnesium oxide, calcium oxide, zinc oxide and cadmium oxide; the metals of group III as boron, scandium, gallium, yttrium, indium, the rare earths and thallium, of which aluminum oxide is of particular value; the metals of group IV as germanium, zirconium, tin, hafnium and lead, and the following oxides which are of particular value—silicon dioxide, titanium dioxide and thorium oxide; the metals of group VI as selenium, molybdenum, tellurium, polonium and uranium, of which chromium oxide and tungsten oxide are of particular value. Illustrative examples of the metals which in the free state, or as the partially reduced metal oxide, are suitable components of catalyst portion (2) are: the silver family of group I, copper, silver and gold, of which copper and silver are of particular value; the metals of group VII as manganese, masurium and rhenium, of which manganese is of particular value; and the metals of group VIII as iron, cobalt and nickel are particularly suitable.

The composite catalysts described above may be combined with or dispersed or supported upon a catalyst carrier material. Any of the composite catalysts in their many variations outlined above may contain other added substances which may exert certain functions upon the reaction, e. g. chromium oxide and/or thorium oxide may be added as a promoting or activating substance to any of the catalysts described above which do not already contain them. Substances which are suitable catalyst carrier materials include inert siliceous materials which may in themselves possess certain hydrative characteristics and thus, when employed in sufficient amounts as carrier materials, may allow the use of smaller amounts of the oxide hydrative catalysts mentioned above. Illustrative examples of materials suitable as catalyst carriers are pumice stone, infusorial earth, Death Valley clay, kieselguhr, alumina, activated alumina, aluminum hydrosilicates and similar partially hydrated silicates, and silicic acid compounds, and the like.

The composite catalysts used in the process of the present invention are solids of the character described above and may be prepared by a large number of methods. For example, activated $Al_2O_3$ may be introduced into the aqueous solution of the nitrates of the metals mentioned above as suitable for the metal and/or partially reduced metal oxide portion of the catalyst until the solution is just absorbed by the $Al_2O_3$. The resulting product may then be dried at elevated temperatures and partially reduced, as, for example, by heating the mixed oxides for a time in the presence of hydrogen. The catalyst may be prepared by precipitating an aqueous solution containing, as nitrates, the metals of the silver group or of group VII or VIII of the periodic table, with ammonia, drying the precipitate and subjecting the dried mixture of oxides to a partial reduction. The catalyst may also be prepared by forming a gelatinous hydroxide gel from a metal of group II, III, IV or VI of the periodic table, impregnating the gel with the nitrate of a silver group metal or metal from groups VII or VIII, drying the product and subjecting it to partial reduction. An active $SiO_2$ may be impregnated with an aqueous solution of nitrates of metals from group VII or VIII or a silver group metal until the $SiO_2$ is saturated with the solution, and a suitable catalyst obtained by partial reduction of the dried product. Still other methods of combining the metal oxide-metal or partially reduced metal oxides to form suitable catalysts for use in the conversion of olefins to ketones in accordance with the process of the invention may be employed.

The composite catalysts may be employed in any desirable or suitable form as, for example, in the form of granules, pellets, powders, etc. of any desired size in manners customary in catalytic processes of the general type to which the invention relates. Usually the desired quantity of catalytic material is packed into a suitable reaction tube or reaction chamber of any appropriate size and of any suitable material. The catalytic material may be maintained at the desired operating temperature by any suitable external heating means, while the olefinic material either in the liquid or the vapor phase is passed through said chamber at a desirable or optimum space velocity and under desirable temperature and pressure conditions. The space velocities to be employed in any particular case depend at least in part on the activity of the particular composite catalyst, the specific olefin or mixtures of olefins to be converted to the corresponding ketones, and upon other operating conditions, especially the temperature and pressure employed.

The space velocities and the temperature may be controlled or regulated for the special substance to be treated, or the catalyst employed, so as to obtain practical conversions at practical rates while substantially avoiding or at least greatly inhibiting various side reactions, as the formation of esters, ethers, alcohols or acids. However, in certain cases where the resultant by-products have a commercial value and may be readily isolated from the reaction products, the space velocity and temperature may be controlled to allow the production of these compounds, thereby resulting in a reduction of the overall cost of producing the desired ketone. Although the space velocities, i. e. the grams of the gaseous or vaporous organic starting material contacted with a liter of catalyst per hour, may be varied within relatively wide limits, it has been found that satisfactory results are obtainable with space velocities ranging from about 5 to about 50 or even higher, the preferred space velocities, particularly for the production of acetone from propylene, being in the range of about 10 to about 25 at temperatures from about 300° C. to about 425° C.

The preferred temperature range for effecting the catalytic conversion in accordance with the present process is between about 200° C. and about 500° C., optimum yields of acetone having been obtained when propylene was treated at temperatures of between about 350° C. and 385° C. to about 425° C. However, in some cases higher or lower temperatures may be used. Generally speaking, at the lower temperatures the catalytic effect of the composite catalyst decreases to such a degree that uneconomically low space velocities may be required to obtain the desired degree of conversion. Very high temperatures are to be avoided because of excessive decomposition of the nuclear carbon structure of the starting material.

The process of the invention is effected at superatmospheric pressures and a temperature at which at least a substantial portion of the reactants exist in the vapor phase. Effective conversions are obtained under pressures of between about 10 and about 50 atmospheres and at temperatures of between about 200° C. and about 500° C. In general, higher yields of ketones are obtained when using higher pressures with the upper limit being those pressures at which only a small portion of the reactants can exist in the vapor phase at the temperatures employed. Optimum yields have been obtained in the conversion of propylene to acetone under pressures of from about 10 atmospheres to about 25 atmospheres at temperatures of from about 300° C. to about 425° C.

The process may be effected in any suitable apparatus for carrying out oxidation or hydration reactions in the vapor phase and may be realized in a batch, intermittent or continuous manner. When operating with a fixed bed catalyst is preferred, the apparatus may comprise a catalyst packed reaction tube or chamber positioned within a metal block, as an aluminum block, which is provided with appropriate heating and/or cooling elements. The reactor may be brought to the reaction temperature before or after the vapors to be reacted are introduced. However, it is preferred to carry out the process in the vapor phase and under substantially increased pressures. Therefore, the olefin is preferably vaporized in the forepart of the tube rather than in a separate vaporizer. In large scale operations it is preferred to carry out the process in a continuous manner, any unreacted olefin and/or steam being recirculated with fresh feed. Although other inert gases or vapors, e. g. nitrogen or the paraffins, may be present as diluents in a wide range of proportions, the composite catalyst employed in the process of the present invention is particularly applicable or adapted to the process wherein steam is present as a major constituent during the contact of the olefinic compounds with the catalyst. It is generally preferable to employ the steam in a substantial molecular excess over the amount of olefinic compound treated, mol ratios of about 5:1 to as high as 40:1 being suitable, optimum conversions of propylene to acetone having been obtained with mol ratios of between about 10:1 and about 20:1.

The composite catalyst may be employed continuously in conversion reactions for forty hours and more with a very slight decrease in "catalytic activity." The activity of the spent or partially spent catalyst may then be restored, wholly or in part, by the methods commonly employed for the regeneration of catalysts of the same general type. A suitable method of regeneration is the flushing of the heated system with an inert gas, followed by mild oxidation with, for example, a stream of air or a nitrogen-air mixture containing about 4% oxygen, during which time the heating of the system is continued and the temperature is allowed to rise during the reaction, but is preferably maintained under about 600° C. Composite catalysts which have been regenerated in this manner following conversion cycles of from 30 to 40 hours have been found to retain their activity for long periods of use, and to even show greater activity after about 300 hours of use than when freshly prepared.

The ketones produced by the process of the invention may be isolated from the effluent gases from the reaction zone by any appropriate means, the exact procedure in any given case being naturally determined by the nature and relative amounts of the other effluent components. The reaction products may be liquefied and separated in a wide variety of suitable manners, depending on the specific product to be recovered and on the particular taste of the operator. The effluent gases may be scrubbed with cold water or other appropriate solvent to remove the carbonyl product which is subsequently recovered from the solvent by any suitable means, as by distillation. The efficiency of the scrubbing operation may be improved when water is employed as the scrubbing agent by adding a suitable wetting agent, e. g. any soap or soap-like substance, to the water. If desired, scrubbing of the reaction gases may be preceded by an initial cold water quenching thereof, which in itself may serve to separate a large portion of the ketone product.

The following examples are presented for the purpose of illustrating the specific and preferred embodiments of the invention as particularly adapted to the catalytic conversion of propylene to produce high yields of acetone. It is to be understood, however, that there is no intention of being limited by the specific conditions or materials disclosed in said examples. The following procedures and apparatus were employed. A measured quantity of propylene was lead through a heated tube to a preheater where it was mixed with the steam supplied by evaporation of a measured quantity of water in the preheater. After passing the preheater, the mixture enters a tin-treated stainless steel reaction tube having an internal diameter of 34 mm. which forms a part of the preheater. The reaction tube was fitted with a pyrometer, contained the catalyst supported in the center of the tube between two perforated discs, and was heated by an electric block furnace. The reaction mixture was condensed in a copper receiver under pressure. The pressure was reduced to 1 atm. by a valve and the gaseous products were passed through a caustic soda solution to absorb carbon dioxide. In some cases a cooler was placed between the receiver and the caustic wash bottle to collect traces of acetone. The gases leaving the wash bottle were measured and samples taken for analysis. A bypass runs from the propylene feed tube to the receiver of the reaction product, through which the pressure can be increased in the apparatus before the experiment; this may also be accomplished by nitrogen. The propylene tube contained a branch through which air and hydrogen can be introduced into the reaction tube for the regeneration of the catalyst.

The catalysts designated by the letters A–F in Table I below were prepared in the following manner:

A. A 20-liter aqueous solution was prepared from 1763 mls. of aluminum nitrate solution containing 0.289 gram of alumina per ml., 332 mols of copper nitrate solution containing 0.1916 gram of copper per ml. and 54.12 grams of thorium nitrate containing 48.8% of thorium oxide. A second 20-liter solution was prepared by diluting 495 mls. of 21.3% ammonium hydroxide with distilled water. The solutions were fed into a small mixing chamber at about 5 liters per hour so that a residual pH of about 8 is obtained. The mixture was heated to 95° C. for a few seconds and allowed to cool. The precipitate was filtered, dried at 110° C. and pressed into pill-shaped grains with a diameter of 5 mm. and a thickness of 4 mm. The grains were then heated several hours at 500° C. in air and subsequently subjected to reduction with hydrogen at 300° C. The grains contain the elements Cu, Al and Th in atomic ratios of 50:50:5.

B. A 20-liter aqueous solution of salts was prepared containing the aluminum, copper and thorium nitrate solutions and salt used in catalyst A in the same proportions plus 416 mls. of chromium nitrate solution, 0.118 gram of chromium oxide per ml., and a 20-liter alkaline solution was prepared by diluting 422 mls. of 21.3% ammonium hydroxide solution with water. The solutions were combined and the precipitate dried as in the preparation of catalyst A. The dried precipitate was granulated, heated for 5 hours under hydrogen at 300° C., under air at 500° C., and again under hydrogen at 250° C.–300° C. for about 10 hours. Catalyst B contains Cu, Al, Th and Cr in atomic ratios of 50:50:5:3.

C. A 20-liter aqueous salt solution was prepared from 1162 mls., 221 mls., 36.08 grams, respectively, of the aluminum, copper and thorium solution and salt used for catalyst A with 596 mls. of a chromium nitrate solution containing 0.26 gram of chromium oxide per ml. An ammonium hydroxide solution was prepared as above from 380 mls. of 21.3% ammonium hydroxide. Grains were prepared as described and heated under hydrogen at 300° C. for 3 hours, under air at 500° C. for 5 hours, and again under hydrogen at 250° C. for about 10 hours. Catalyst C contains Cu, Al, Th, and Cr in atomic ratios of 50:50:5:15.

D. A 10.5-liter solution was prepared by diluting 5981 mls. of aluminum nitrate solution containing 0.0206 gram of alumina per ml. and combined in the manner described with a 10.5-liter solution prepared from 1100 mls. of 24.6% ammonium hydroxide. The gelatinous precipitate obtained was mixed with 154 grams of silver nitrate, dried at 150° C., formed into grains and heated 5 hours under hydrogen at 350° C. Catalyst D contains Al and Ag in atomic ratios of 100:40.

E. A gelatinous mixture was prepared by evaporating 56.7 grams of Sorbsil containing 74.3% of silicon dioxide with a mixture containing 79 mls. copper nitrate solution containing 0.1417 gram of copper per ml., 154.5 mls. chromium nitrate solution containing 0.026 gram chromium nitrate solution and 8.46 grams of thorium nitrate, 48.1% thorium oxide. The mixture was dried at 150° C. and heated 5 hours under hydrogen at 300° C. Catalyst E contains Si, Cu, Cr and Th in atomic ratios of 100:25:7.5:2.5.

F. A 20-liter aqueous solution was prepared from 4 liters of aluminum nitrate solution containing 0.0206 gram of alumina per ml., 39.4 grams of $Ni(NO_3)_2 \cdot 6H_2O$, 39.4 grams of $Co(NO_3)_2 \cdot 6H_2O$ and 13.05 grams of $Th(NO_3)_4$. A 20-liter alkaline solution was prepared by diluting 320 mls. of 26.8% ammonium hydroxide solution with distilled water. The mixed precipitate obtained as for Catalyst A was dried at 150° C. and pressed into grains which were heated 5 hours under hydrogen at 300° C. Catalyst F contains the elements Al, Ni, Co and Th in atomic ratios of 100:12.5:12.5:2.5.

Table

| No. | Catalyst | Pressure | Temperature | Duration of run | R* | Grams/l., hour | Mole Per Cent Propylene converted to— | |
|---|---|---|---|---|---|---|---|---|
| | | | | | | | Acetone | $CO_2$ |
| | | Atm. | °C. | Hours | | | | |
| 1 | A | 11 | 350 | 12 | 20 | 12 | 15.2 | 0.9 |
| 2 | B | 11 | 350 | 12 | 20 | 12 | 24.4 | 0.0 |
| 3 | C | 11 | 350 | 12 | 20 | 12 | 16.8 | 0.7 |
| 4 | C | 11 | 400 | 12 | 20 | 12 | 26.3 | 1.8 |
| 5 | C | 11 | 425 | 12 | 20 | 10 | 24.2 | 5.6 |
| 6 | C | 21 | 325 | 12 | 20 | 10 | 4.5 | 0.6 |
| 7 | C | 21 | 400 | 11 | 20 | 9 | 33.4 | 3.7 |
| 8 | D | 21 | 375 | 12 | 20 | 12 | 6.3 | 4.0 |
| 9 | E | 21 | 375 | 12 | 20 | 12 | 4.2 | 0.4 |
| 10 | F | 21 | 375 | 12 | 20 | 12 | 3.0 | 0.8 |

R*=ratio of moles of steam to 1 mole of propylene.

The propylene conversion percentages may be greatly increased by recycling the whole of the gaseous reaction product, or even further increased by isolating and recycling the unreacted propylene. Under optimum conditions recycle yields of 80% have been obtained over conversion periods of 40 hours.

I claim as my invention:

1. A process for the production of acetone comprising treating propylene with a molar excess of steam at a temperature of between about 325° C. and about 425° C. under a pressure of between about 12 atmospheres and about 24 atmospheres in the presence of a catalyst prepared by intimately mixing the oxides of the elements Al, Cu, Th and Cr in atomic ratios of 50:50:5:15 and subjecting the mixture of oxides to a partial reduction with hydrogen.

2. A process for the production of acetone comprising treating propylene with a molar excess of steam at a temperature of between about 325° C. and about 425° C. under a pressure of between about 12 atmospheres and about 24 atmospheres in the presence of a catalyst consisting of major portions of copper and alumina with minor portions of chromium oxide and thorium oxide.

3. A process for the production of acetone comprising treating propylene with a molar excess of steam at a temperature of between about 325° C. and about 425° C. under a pressure of between about 12 atmospheres and about 24 atmospheres in the presence of a catalyst consisting of major portions of copper and alumina with a minor portion of thorium oxide.

4. A process for the production of acetone comprising treating propylene with a molar excess of steam at a temperature of between about 325° C. and about 425° C. under a pressure of between about 12 atmospheres and about 24 atmospheres in the presence of a catalyst prepared by intimately mixing the oxides of the elements Cu, Al and Th in atomic ratios of 50:50:5 and subjecting the mixed oxides to a partial reduction with hydrogen.

5. A process for the production of an aliphatic ketone comprising treating a monoolefin with a molar excess of steam at a temperature of between about 200° C. and about 500° C. under a pressure of between about 10 and about 50 atmospheres in the presence of a catalyst prepared by intimately mixing the oxides of the elements Al, Cu, Th and Cr in atomic ratios of 50:50:5:15 and subjecting the mixed oxides to a partial reduction with hydrogen.

6. A process for the production of an aliphatic ketone comprising treating a monoolefin with a molar excess of steam at a temperature of between about 200° C. and about 500° C. under a pressure of between about 10 and about 50 atmospheres in the presence of a catalyst consisting of major portions of copper and alumina with minor portions of chromium oxide and thorium oxide.

7. A process for the production of an aliphatic ketone comprising treating a monoolefin containing at least three carbon atoms with a molar excess of steam at a temperature of between about 200° C. and about 500° C. under a pressure of between about 10 and about 50 atmospheres in the presence of a catalyst consisting essentially of major portions of copper and alumina with minor portion of at least the first of thorium oxide and chromium oxide.

WILLEM FREDERIK ENGEL.

REFERENCES CITED

The following references are of record in the file of this patent:

UNITED STATES PATENTS

| Number | Name | Date |
|---|---|---|
| 1,926,575 | Zobel et al. | Sept. 12, 1933 |
| 1,999,620 | Van Peski et al. | Apr. 30, 1935 |

FOREIGN PATENTS

| Number | Country | Date |
|---|---|---|
| 59,179 | Netherlands | Apr. 15, 1947 |